United States Patent
Sharma

(10) Patent No.: US 9,122,354 B2
(45) Date of Patent: Sep. 1, 2015

(54) DETECTING WAVE GESTURES NEAR AN ILLUMINATED SURFACE

(71) Applicant: Texas Instruments Incorporated, Dallas, TX (US)

(72) Inventor: Vinay Sharma, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 323 days.

(21) Appl. No.: 13/828,404

(22) Filed: Mar. 14, 2013

(65) Prior Publication Data

US 2013/0241888 A1 Sep. 19, 2013

Related U.S. Application Data

(60) Provisional application No. 61/610,877, filed on Mar. 14, 2012.

(51) Int. Cl.
 *G06F 3/042* (2006.01)
 *G06F 3/01* (2006.01)
 *G06F 3/041* (2006.01)
 *G06F 3/03* (2006.01)
 *H04N 7/18* (2006.01)

(52) U.S. Cl.
 CPC .............. *G06F 3/0425* (2013.01); *G06F 3/017* (2013.01); *G06F 3/0416* (2013.01); *G06F 3/0304* (2013.01); *G06F 2203/04108* (2013.01); *H04N 7/188* (2013.01)

(58) Field of Classification Search
 USPC ......................................................... 345/175
 See application file for complete search history.

(56) References Cited

U.S. PATENT DOCUMENTS

| 5,107,253 A | 4/1992 | Meadows | |
|---|---|---|---|
| 8,819,812 B1* | 8/2014 | Weber et al. | 726/19 |
| 2005/0168448 A1 | 8/2005 | Simpson | |
| 2006/0013440 A1* | 1/2006 | Cohen et al. | 382/103 |
| 2008/0122803 A1* | 5/2008 | Izadi et al. | 345/175 |
| 2008/0134102 A1* | 6/2008 | Movold et al. | 715/863 |
| 2010/0027846 A1* | 2/2010 | Xu et al. | 382/107 |
| 2011/0180709 A1* | 7/2011 | Craddock et al. | 250/338.1 |
| 2011/0182519 A1* | 7/2011 | Craddock et al. | 382/190 |
| 2011/0248151 A1* | 10/2011 | Holcombe et al. | 250/221 |
| 2011/0310005 A1* | 12/2011 | Chen et al. | 345/156 |

(Continued)

FOREIGN PATENT DOCUMENTS

JP 2002052246 A * 2/2002

OTHER PUBLICATIONS

Kong et al, "Development of the Fishbowl Game Employing a Table-top Tiled Display Coupling with Mobile Interfaces", Journal of Korea Game Society, v. 10, No. 2, 2010, p. 57-66.*

(Continued)

*Primary Examiner* — Julie Anne Watko
(74) *Attorney, Agent, or Firm* — Mima Abyad; Frank D. Cimino

(57) ABSTRACT

A method for wave gesture detection performed by a touch processor in an optical touch detection system is provided. The method includes receiving a sequence of images of an illuminated surface comprised in the optical touch detection system, wherein the images are captured by a camera comprised in the optical touch detection system, detecting a wave gesture performed in front of the illuminated surface by analyzing the sequence of images, and outputting an indication that a wave gesture has been detected.

18 Claims, 3 Drawing Sheets

(56) References Cited

U.S. PATENT DOCUMENTS

| | | | | |
|---|---|---|---|---|
| 2012/0280900 | A1* | 11/2012 | Wang et al. | 345/156 |
| 2012/0280904 | A1* | 11/2012 | Skurnik et al. | 345/156 |
| 2013/0004016 | A1* | 1/2013 | Karakotsios et al. | 382/103 |
| 2013/0182246 | A1* | 7/2013 | Tanase | 356/218 |
| 2015/0022316 | A1* | 1/2015 | Dixon et al. | 340/5.51 |
| 2015/0029086 | A1* | 1/2015 | Mankowski et al. | 345/156 |
| 2015/0054774 | A1* | 2/2015 | Fergusson et al. | 345/174 |

OTHER PUBLICATIONS

Alan SY "Designing IR Gesture-Sensing Systems", EDN, Jun. 9, 2011, pp. 37-39, EDN Network.

Pia Breuer et al, "Hand Gesture Recognition with a Novel IR Time-of-Flight Range Camera—A Pilot Study", MIRAGE'07 Proceedings of the 3rd International Conference on Computer Vision/Computer Graphics Collaboration Techniques, Mar. 28-30, 2007, pp. 247-260, Springer-Verlag.

Ian Maxwell, "An Overview of Optical-Touch Technologies", Information Display, Dec. 2007, vol. 23, No. 12, pp. 26-30, Society for Information Display (SID).

P.C. Mahalanobis, "On the Generalized Distance in Statistics", Proceedings National Institute of Science, India, vol. 2, No. 1, Apr. 16, 1936, pp. 49-55, Calcutta, India.

Geoff Walker and Mark Fihn, "Beneath the Surface", Information Display, Mar. 2010, vol. 26, No. 3, pp. 32-34, Society for Information Display (SID).

Geoff Walker, "Camera-Based Optical Touch Technology", Information Display, Mar. 2011, vol. 27, No. 3, pp. 30-34, Society for Information Display (SID).

Jacob O. Wobbrock et al, "User-Defined Gestures for Surface Computing", Proceedings of the SIGCHI Conference on Human Factors in Computing Systems, CHI 2009, Apr. 4-9, 2009, pp. 1083-1092.

Heng-Tze Cheng et al, "Contactless Gesture Recognition System Using Proximity Sensors", Consumer Electronics (ICCE), 2011 IEE International Conference on, Jan. 9-12, 2011, pp. 149-510.

* cited by examiner

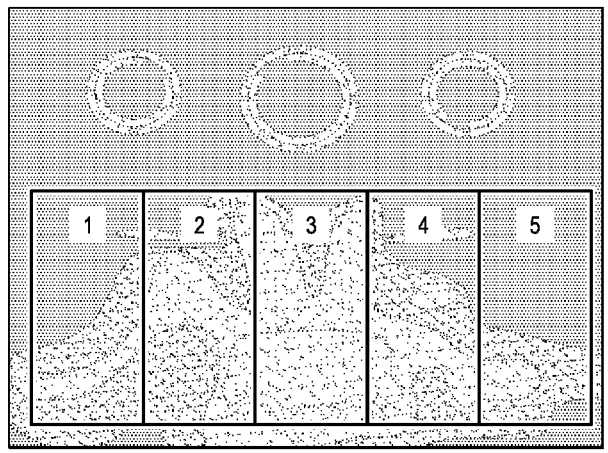
FIG. 5A
| | | V = 2, L = 3 | V = 1, L = 4 |
|---|---|---|---|
| S = [ 10  14  15  17  8 ] | | YES | NO |
| S = [ 20  22  24  25  26 ] | | YES | YES |
FIG. 5B
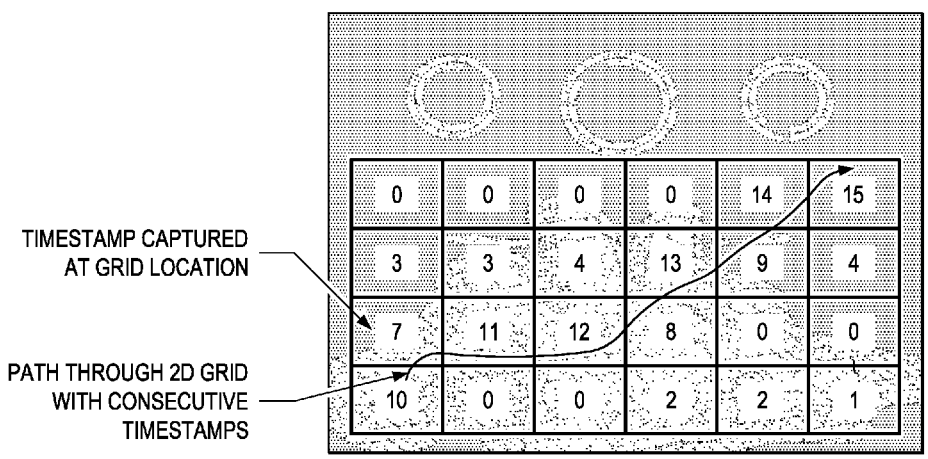
FIG. 6

DETECTING WAVE GESTURES NEAR AN ILLUMINATED SURFACE

CROSS-REFERENCE TO RELATED APPLICATIONS

This application claims benefit of U.S. Provisional Patent Application Ser. No. 61/610,877, filed Mar. 14, 2012, which is incorporated herein by reference in its entirety. This application is related to co-pending U.S. patent application Ser. No. 13/828,292, filed Mar. 14, 2013, co-pending U.S. patent application Ser. No. 13/828,641, filed Mar. 14, 2013, co-pending U.S. patent application Ser. No. 13/828,736, filed Mar. 14, 2013, and co-pending U.S. patent application Ser. No. 13/828,526, filed Mar. 14, 2013, which are incorporated by reference herein in their entirety.

BACKGROUND OF THE INVENTION

1. Field of the Invention

Embodiments of the present invention generally relate to detecting wave gestures near an illuminated surface.

2. Description of the Related Art

Touch displays are used in many consumer applications (e.g., smart phones, computer displays, medical imaging devices, automotive control displays, etc.) to provide an intuitive user interface. The touch detection technology used in such displays includes electrical capacitance detection, electrical resistance detection, and optical detection. For optical touch detection, one or more imaging sensors and a light source (e.g., one or more infrared cameras and infrared light-emitting diodes (LEDs)) may be used to capture images of a touch surface. The captured images are processed to detect objects (e.g., a finger or a stylus or an entire hand) touching or near the surface. The ability to recognize touchless gestures, e.g., the waving of a hand or other reflective objects, performed near the display surface is desirable. For example, a user may not want to touch the display surface or a user may need to operate an interface while his/her gaze is averted from the display surface, e.g., while driving or operating equipment.

SUMMARY

Embodiments of the present invention relate to methods, apparatus, and computer readable media for detecting a wave gesture. In one aspect, a method for wave gesture detection performed by a touch processor in an optical touch detection system is provided. The method includes receiving a sequence of images of an illuminated surface comprised in the optical touch detection system, wherein the images are captured by a camera comprised in the optical touch detection system, detecting a wave gesture performed in front of the illuminated surface by analyzing the sequence of images, and outputting an indication that a wave gesture has been detected.

In one aspect, an optical touch detection system configured for wave gesture detection is provided that includes an illuminated surface, a camera positioned to capture images of the illuminated surface, means for receiving a sequence of images of the illuminated surface captured by the camera, means for detecting a wave gesture performed in front of the illuminated surface by analyzing the sequence of images, and means for outputting an indication that a wave gesture has been detected.

In one aspect, a computer readable medium storing software instructions that, when executed by a touch processor comprised in an optical touch detection system, cause the optical touch detection system to perform a method for wave gesture detection is provided. The method includes receiving a sequence of images of an illuminated surface comprised in the optical touch detection system, wherein the images are captured by a camera comprised in the optical touch detection system, detecting a wave gesture performed in front of the illuminated surface by analyzing the sequence of images, and outputting an indication that a wave gesture has been detected.

BRIEF DESCRIPTION OF THE DRAWINGS

Particular embodiments will now be described, by way of example only, and with reference to the accompanying drawings:

FIGS. 4-6 are examples.

DETAILED DESCRIPTION OF EMBODIMENTS OF THE INVENTION

Figure 1:
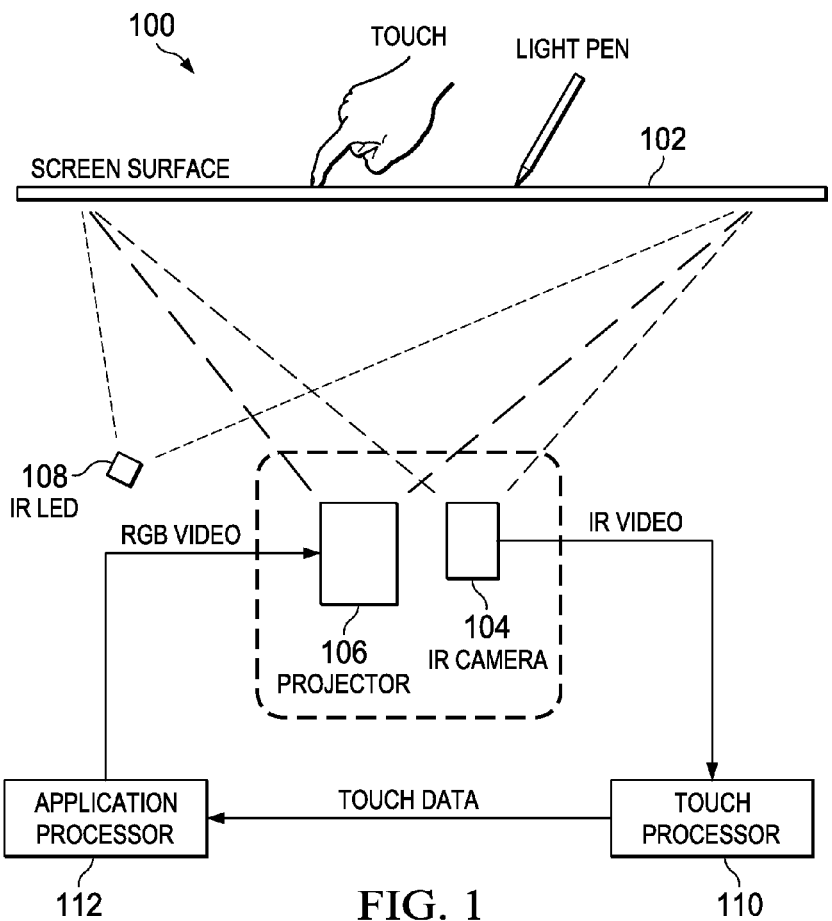
FIG. 1 is a high level block diagram of an example optical touch detection system.

Specific embodiments of the invention will now be described in detail with reference to the accompanying figures. Like elements in the various figures are denoted by like reference numerals for consistency.

Embodiments of the invention provide for detection of a wave gesture performed an illuminated surface of an optical touch detection system. Computer vision analysis techniques are applied to the analysis of images of the illuminated surface captured by an IR camera to detect wave gestures and to determine the direction of the wave gestures. When a wave gesture is detected in a specified region over a sequence of images, an indication that a wave gesture has been detected is output for further processing in an application associated with the region. In some embodiments, an indication of the direction of the wave gesture is also output.

FIG. 1 is a high level block diagram of an example optical touch detection system 100. The optical touch detection system 100 includes a screen 102, an IR camera 104, a projector 106, one or more IR LEDs 108, a touch processor 110, and an application processor 112. The projector 106 is placed behind the screen 102 and projects RGB video from the application processor 112 on the rear surface of the screen 102. The projector 106 may be any suitable projection system, such as, for example, a digital light processing (DLP) projection system, a liquid crystal display (LCD) projection system, or a liquid crystal on silicon (LCOS) projection system.

Figure 2:
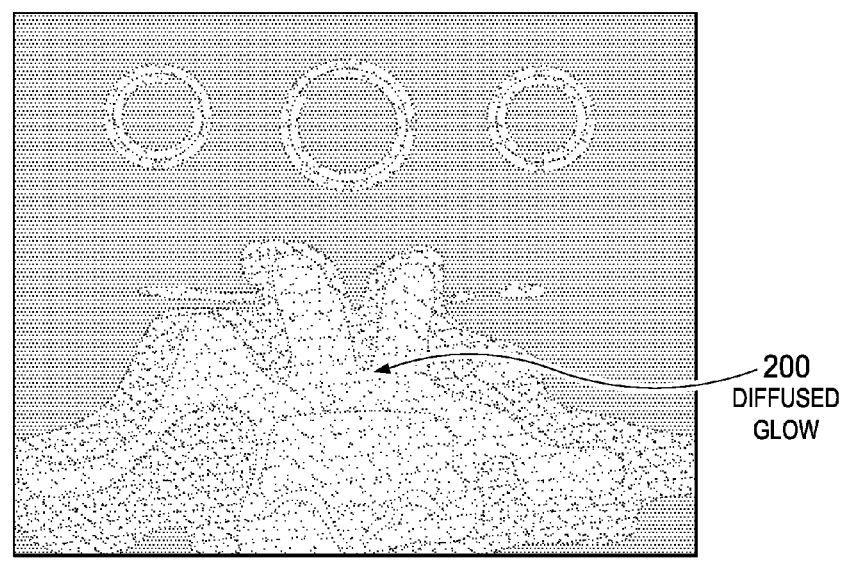
FIG. 2 is an example.

The IR light emitting diodes 108 are placed behind the screen 102 and arranged to flood IR light through the rear surface of the screen 102, with some IR light reflecting back from the screen 102. The IR camera 104 is placed behind the screen and is arranged to capture a video of IR images formed from the IR light impinging on the sensor. When an object, e.g., a finger, pen, etc., touches the surface of the screen 102, the IR images (frames) in the video change in the location of the touch as the IR light transmitting through the screen 102 is reflected back at the touch location and captured by the camera sensor. Further, the images change as an object, such as a user's hand, moves in front of the screen 102 within sufficient proximity to cause IR light reflections. More specifically, the transmittance/reflectance properties of the display screen 102, the relative strength of the infra red illumination from the IR light emitting diodes 108, and the sensitivity of the IR camera 104 are calibrated such that the camera 104 captures some reflected infra red light from a hand (or body part) when it is placed in close proximity to, e.g., within a few inches of, the display surface 102. As illustrated in the example of FIG. 2, the infrared light reflected by the hand appears as a diffused glow 200 in the images captured by the camera 104.

The touch processor 110 receives IR video from the IR camera 104 and processes each frame to identify touch data such as touch locations, gestures, touch trajectory, etc. The operation of the touch processor 110 to determine touch locations and to perform touch tracking may be performed in any suitable way. The above referenced U.S. patent application Ser. No. 13/828,292, provides examples of the operation of a touch processor for touch detection and tracking. The touch processor 110 is configured to perform an embodiment of a method for wave gesture detection as described herein in reference to FIG. 3.

The application processor 112 hosts applications available to a user of the optical touch detection system 100 and provides the RGB video, e.g., a touch activated user interface, which is to be displayed on the screen 102 by the projector 106. The application processor 112 receives touch data from the touch processor 110 and uses the touch data to determine what, if any, actions are to be performed responsive to the touch data. For example, if the touch data indicates that a user has touched an icon displayed on the screen 102, the application processor 112 may execute an application associated with that icon, which in turn will cause the application processor 112 to change the content of the RGB video being displayed in some application specific way. Similarly, if the touch data indicates that a wave gesture has been detected in a region of the screen 102 associated with an application responsive to wave gestures, the application processor 112 executes the associated application, which in turn may cause the application processor to change the content of the RGB video being displayed in some application specific way.

Figure 3:
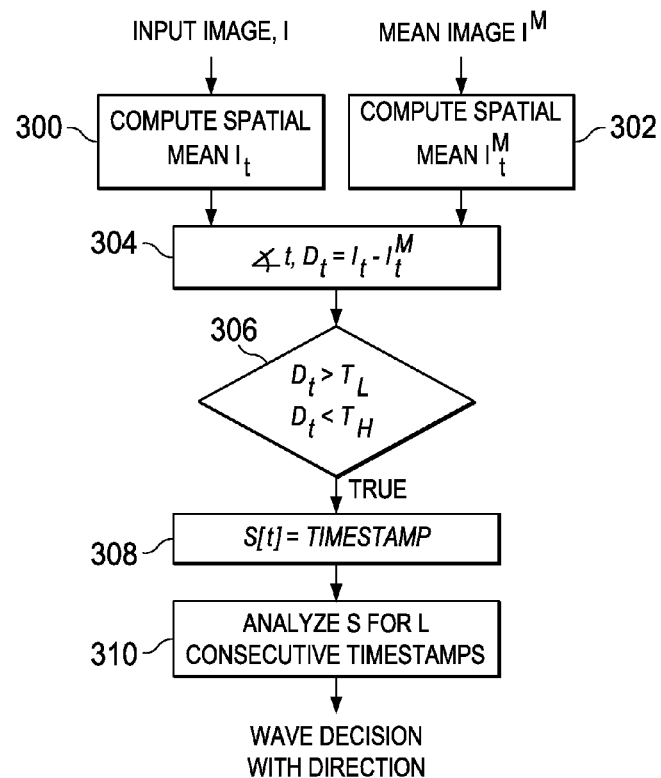
FIG. 3 is a flow diagram of a method for wave gesture detection.

FIG. 3 is a flow diagram of a method for wave gesture detection that may be executed in an optical touch detection system, e.g., the system of FIG. 1. The method may be executed on each frame (image) of a video stream captured by an infrared camera positioned behind the display screen to capture infrared light reflections caused by objects approaching and/or touching the surface of the display screen.

Figure 4:
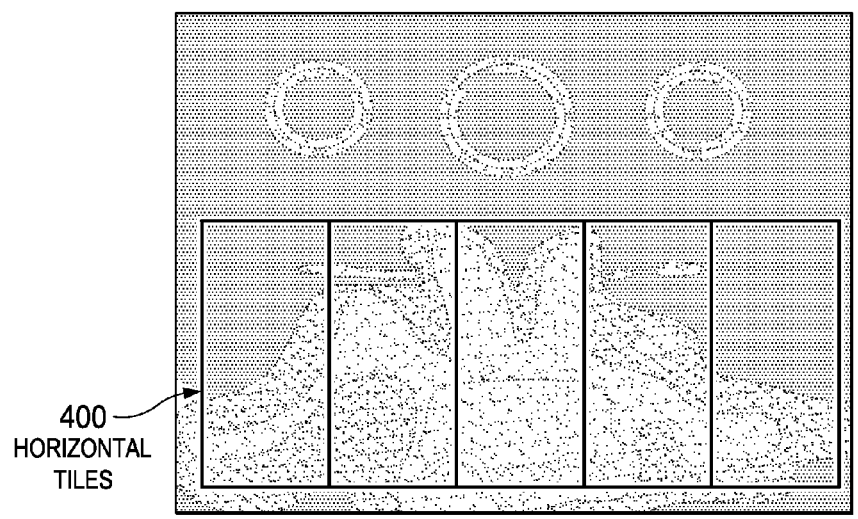

The method assumes that an M×N rectangular region of the display screen is an area within which wave gestures are to be detected. For example, the wave gesture region may be an area in a graphical user interface projected on the display screen that is associated with an application responsive to wave gestures. The particular size, location, and orientation, i.e., horizontal or vertical, of the wave gesture region may be application dependent. The M×N wave gesture region is divided into R smaller rectangular regions, i.e., tiles. The value of R, i.e., the number of tiles, may be application dependent. If a horizontal wave gesture is to be detected, the horizontal dimension of the region is divided into R tiles in which the height of each tile is the vertical dimension of the wave gesture region. FIG. 4 shows the example image of FIG. 2 with a horizontal wave gesture region 400 of five tiles in the area of the diffused glow. If a vertical wave gesture is to be detected, the vertical dimension of the wave gesture region is divided into R tiles in which the width of each tile is the horizontal dimension of the wave gesture region. If a wave gesture is to be detected in different arbitrary directions, the wave gesture region is divided into a two-dimensional grid of R tiles.

The method also assumes that a background image, also referred to as a temporal mean image or mean image, is maintained to capture any non-uniformities and artifacts that might exist in the IR light reflecting from the screen. This mean image, denoted as $I^M$ may be maintained using any suitable background modeling technique. In one embodiment, the background image $I^M$ is computed using a technique in which the lowest intensity value at each pixel location is preserved as the background image. As the IR camera captures images, the intensity at each pixel of the input image is compared against the intensity of the corresponding pixel in the background image. If the input pixel intensity is lower than the background pixel intensity, the value of the background pixel in the background image is changed to be that of the input pixel; if not, the value of the background pixel is not changed.

In one embodiment, a single Gaussian model is used to capture the background image. That is, the mean and variance values for each pixel of the input image are maintained. For each input frame, the Mahalanobis distance of the input image is compared to the mean image. If the Mahalanobis distance of a pixel is greater than a threshold, the pixel is flagged as a candidate foreground pixel. For each pixel that does not pass the threshold, the mean value and the variance value are updated using an exponentially weighted update rule. The Mahalanobis distance is described in Mahalanobis, P., "On the Generalised Distance in Statistics," Proceedings of the National Institute of Sciences of India, Vol. 2, No. 1, pp. 49-55, Apr. 16, 1936.

As previously mentioned, the method of FIG. 3 is performed for each image in an IR video stream captured by the IR camera. For simplicity of description, the method is first described assuming that the orientation of the wave gesture region is horizontal as shown in the example of FIG. 4. One or ordinary skill in the art, having benefit of this description, will understand embodiments in which the orientation of the wave gesture region is vertical. An embodiment of the method that can detect wave gestures in arbitrary directions is then explained.

For the input image I, the spatial mean $I_t$ is computed 300 for each of the N tiles t in the wave gesture region. The spatial mean $I^M_t$ is also computed 302 for N tiles of the same size in corresponding locations in the mean image $I^M$. The spatial mean of a tile is the arithmetic mean of the intensities of all pixels in the tile. For each tile t, the difference $D_t$ between the spatial mean of the tile $I_t$ and the spatial mean of the corresponding mean image tile $I^M_t$ is computed 304 as per $$D_t = I_t - I^M_t, \ 1 \leq t \leq N.$$

The spatial mean differences $D_t$ are then compared 306 to a low threshold $T_L$ and a high threshold $T_H$, i.e., $D_t > T_L$ && $D_t < T_H$. If a spatial mean difference $D_t$ meets these conditions 306, a timestamp is stored 306 in a corresponding entry in an array of timestamps S, i.e., S[t]=current time stamp; otherwise, the corresponding entry is not changed. The tiles may be processed in steps 302-308 in any suitable order.

The values of the thresholds $T_L$ and $T_H$ may be empirically determined during a calibration phase. The threshold values are selected such that an object is required to be within a certain distance range from the display surface. The most distant an object can be is determined by $T_L$. The closest an object can be is determined by $T_H$. Thus, an object should be in a position such that the reflected IR intensity is between $T_L$ and $T_H$. If reflected intensity is less than $T_L$, the object is too far away. If the reflected intensity is greater than $T_H$, the object is assumed to be approaching the screen to register a touch event.

For a given input image, the value of the timestamp is fixed, i.e., any entries in the array S that are updated as a result of steps 302-308 for a given input image are updated by the same timestamp value. A timestamp may be any monotonically increasing quantity that is representative of elapsed time and increases over time. For example, a timestamp can be read out of the "wall clock" of processor that corresponds to an input image. In another example, the timestamp may be an integer counter that increments each time a new input image is captured. The difference between two timestamps captures the relative time interval between the two timestamped events.

The entries in the timestamp array S are analyzed 308 to determine if a wave gesture has occurred and, if so, the direction of the wave gesture. More specifically, the array S is analyzed to see if a sufficiently long number of consecutive time stamps, i.e., L consecutive time stamps, are present in contiguous locations of S. The behavior of the wave detection is controlled along two dimensions: wave speed (V), and wave length (L). Any suitable values for V and L may be used. As the value of V is increased, slower hand waves can be detected. And, as the value of L is increased, the hand wave gesture has to cover a greater distance across the wave gesture region. The value of L determines the minimum number of consecutive time stamps needed for a wave gesture to be indicated. Note that the value of L should be no larger than the number of tiles R. The value of V determines whether or not timestamps in the timestamp array S are consecutive, i.e., if $abs(S[t]-S[t-1]) \leq V$, then $S[t]$ and $S[t-1]$ are considered to be consecutive.

FIG. 5 shows an example of analyzing a timestamp array S for determining whether or not a wave gesture has occurred for different values of V and L. In the first instance, the timestamps reveal a short and slow gesture, which passes the criteria of V=2 and L=3, but fails to pass the threshold of L=4. In the second instance, the timestamps reveal a smooth, quick, and long gesture, which meets the example criteria of both sets of V and L values.

Directionality of a wave gesture is determined by tracking the sign of each of the $S[t]-S[t-1]$ computations. If the tracked sign is positive, the timestamps are increasing from left to right, and hence the wave gesture is moving from left to right; otherwise, the wave gesture is moving from right to left.

Thus, at each frame, the timestamp array S is updated 302-308 and S is analyzed 310 for the occurrence of at least L consecutive timestamps. If there are L consecutive timestamps in the timestamp array with timestamps increasing from left-to-right or right-to-left, a wave decision is output that indicates that a wave gesture has been detected in the corresponding direction (left-to-right or right-to-left). When a wave gesture is detected, the entries in timestamp array S are reset, e.g., to all zeros, to initiate the process of looking for another wave gesture beginning with the next input frame. If a wave gesture is not detected at an input image, a wave decision is output that indicates no wave has been detected. The output wave decision may also include the direction of the detected wave gesture.

In some embodiments, more than one wave gesture region may be defined for a graphical user interface projected on the display screen. In such embodiments, the method of FIG. 3 may be applied multiple times for each image, once for each defined wave gesture region. In such embodiments, the output wave decisions may also indicate the wave gesture region to which a decision applies.

As previously mentioned, an embodiment of the method can be used to detect wave gestures in arbitrary directions across a wave gesture region. As illustrated in the example of FIG. 6, the wave gesture region is divided into a two-dimensional (2D) grid of tiles. Thus, the timestamp data structure S is a 2D matrix instead of a linear array as for the horizontal (or vertical) wave gesture detection. At each input image, the timestamp values of these tiles (or, correspondingly, the entries in S) are updated as described above. At the analysis step 310, the matrix S is analyzed to detect a sufficiently long contiguous path of consecutive timestamps, where the required length as specified by L and V controls the permissible difference between consecutive timestamps. Which tiles in the 2D grid to be considered as contiguous for purposes of this analysis is implementation dependent. For example, in some embodiments, the north, south, east, and west neighbors of a tile (or a matrix location) are treated as being contiguous. In other embodiments, the neighbors along the diagonals are also considered to be contiguous tiles. In FIG. 6, the depicted wave motion can be detected by setting V to a value of 1 or greater, setting L to a value of 6, and defining all 8 neighbors of a tile as contiguous to the center tile.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments are described herein in which IR LEDs provide the light source and an IR camera is used to capture the images. One of ordinary skill in the art will understand embodiments in which the light source produces light in other than the IR band and the corresponding imaging sensor is tuned to this light. As is well known, there are two main criteria for choosing a suitable light source: 1) the light should be within a narrow band in the electro-magnetic spectrum so that the sensor (camera) can be tuned to detect only that specific band of light energy, and 2) if visible light is projected on the screen, for, e.g., a visible user interface, the light used for touch detection should be distinct from the visible light spectrum so that the projected RGB video does not interfere with the touch detection process.

In another example, embodiments are described herein in which the light source, camera, and projector are positioned behind the touch surface. One of ordinary skill in the art will understand embodiments in which the light source, camera, and projector are suitably positioned in front of the touch surface and/or behind the touch surface. For example, the projector may be appropriately positioned in front of the touch screen and the light source and camera may be appropriately positioned behind the touch screen.

In another example, embodiments are described herein in which a projector is used to project a user interface on a display screen. One of ordinary skill in the art will understand embodiments in which a projector is not used. For example, in some low-cost touch systems with fixed functionality, the user interface may be directly "painted" onto the display screen and does not change. When a user waves a hand in front of the display screen, a wave gesture may be determined as described herein and an application may be triggered responsive to the wave gesture to, e.g., deliver a selected product or to capture a photograph or to increase a temperature or to generate a sound, or to issue a ticket or to dim a light or to summon a waiter, etc.

Embodiments of the methods, the application processor 112, and the touch processor 110 described herein may be implemented in hardware, software, firmware, or any suitable combination thereof, such as, for example, one or more digital signal processors (DSPs), microprocessors, discrete logic, application specific integrated circuits (ASICs), field-programmable gate arrays (FPGAs), etc. The application processor 112 and the touch processor 110 may be separate processors or may be implemented as a single system on a chip (SoC) such as an Open Multimedia Application Platform (OMAP) SoC available from Texas Instruments, Inc. Any software instructions may be initially stored in a computer-readable medium and loaded and executed in a processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for wave gesture detection performed by a touch processor in an optical touch detection system, the method comprising:
    receiving a sequence of images of an illuminated surface comprised in the optical touch detection system, wherein the images are captured by a camera comprised in the optical touch detection system;
    detecting a wave gesture performed in front of the illuminated surface by analyzing the sequence of images, wherein the detecting of the wave gesture comprises:
        computing a spatial mean for each of a plurality of tiles in a wave gesture region of an image;
        computing a spatial mean for each of a plurality of tiles in a background image, each of the plurality of tiles in the background image corresponding to a tile in the wave gesture region;
        computing, for each tile in the wave gesture region, a difference between the spatial mean of the tile and the spatial mean of the corresponding tile in the background image;
        updating corresponding timestamps in a timestamp data structure for tiles in the wave gesture region having spatial mean differences indicating sufficient reflected light intensity in the tile, wherein the timestamp data structure stores timestamps for each tile of the wave gesture region; and
        analyzing the timestamps in the timestamp data structure to determine if a wave gesture has occurred; and
    outputting an indication that a wave gesture has been detected.

2. The method of claim 1, further comprising:
    determining a direction of the detected wave gesture; and
    outputting the direction.

3. The method of claim 1, wherein detecting a wave gesture is responsive to a velocity of the wave gesture and a length of the wave gesture.

4. The method of claim 1, wherein detecting a wave gesture is responsive to proximity of an object being waved to the illuminated surface.

5. The method of claim 4, wherein the proximity is measured by reflected light intensity.

6. The method of claim 1, wherein analyzing the timestamps comprises determining whether or not a sufficient number of consecutive timestamps are present in the timestamp data structure.

7. The method of claim 6, wherein determining whether or not a sufficient number of consecutive timestamps are present comprises comparing timestamps corresponding to contiguous tiles based on a predetermined wave velocity to determine if the timestamps are consecutive.

8. The method of claim 1, wherein a spatial mean difference indicates sufficient reflected light intensity when the spatial mean difference is between a predetermined high threshold and a predetermined low threshold, the thresholds defining a proximity range in which a wave gesture can be detected.

9. The method of claim 1, wherein the camera is an infrared camera.

10. An optical touch detection system configured for wave gesture detection, the system comprising:
    an illuminated surface;
    a camera positioned to capture images of the illuminated surface;
    means for receiving a sequence of images of the illuminated surface captured by the camera;
    means for detecting a wave gesture performed in front of the illuminated surface by analyzing the sequence of images, wherein the means for detecting a wave gesture comprises:
        means for computing a spatial mean for each of a plurality of tiles in a wave gesture region of an image;
        means for computing a spatial mean for each of a plurality of tiles in a background image, each of the plurality of tiles in the background image corresponding to a tile in the wave gesture region;
        means for computing, for each tile in the wave gesture region, a difference between the spatial mean of the tile and the spatial mean of the corresponding tile in the background image;
        means for updating corresponding timestamps in a timestamp data structure for tiles in the wave gesture region having spatial mean differences indicating sufficient reflected light intensity in the tile, wherein the timestamp data structure stores timestamps for each tile of the wave gesture region; and
        means for analyzing the timestamps in the timestamp data structure to determine if a wave gesture has occurred; and
    means for outputting an indication that a wave gesture has been detected.

11. The optical touch detection system of claim 10, further comprising:
    means for determining a direction of the detected wave gesture; and
    means for outputting the direction.

12. The optical touch detection system of claim 10, wherein the means for detecting a wave gesture is responsive to a velocity of the wave gesture and a length of the wave gesture.

13. The optical touch detection system of claim 10, wherein the means for detecting a wave gesture is responsive to proximity of an object being waved to the illuminated surface.

14. The optical touch detection system of claim 10, herein the means for analyzing the timestamps determines whether or not a sufficient number of consecutive timestamps are present in the timestamp data structure.

15. The optical touch detection system of claim 14, wherein determining whether or not a sufficient number of consecutive timestamps are present comprises comparing timestamps corresponding to contiguous tiles based on a predetermined wave velocity to determine if the timestamps are consecutive.

16. The optical touch detection system of claim 10, wherein a spatial mean difference indicates sufficient reflected light intensity when the spatial mean difference is between a predetermined high threshold and a predetermined low threshold, the thresholds defining a proximity range in which a wave gesture can be detected.

17. The optical touch detection system of claim 10, wherein the camera is an infrared camera.

18. A non-transitory computer readable medium storing software instructions that, when executed by a touch processor comprised in an optical touch detection system, cause the optical touch detection system to perform a method for wave gesture detection, the method comprising:
  receiving a sequence of images of an illuminated surface comprised in the optical touch detection system, wherein the images are captured by a camera comprised in the optical touch detection system;
  detecting a wave gesture performed in front of the illuminated surface by analyzing the sequence of images, wherein the means for detecting a wave gesture comprises:
    means for computing a spatial mean for each of a plurality of tiles in a wave gesture region of an image;
    means for computing a spatial mean for each of a plurality of tiles in a background image, each of the plurality of tiles in the background image corresponding to a tile in the wave gesture region;
    means for computing, for each tile in the wave gesture region, a difference between the spatial mean of the ile and the spatial mean of the corresponding tile in the background image;
    means for updating corresponding timestamps in a timestamp data structure for tiles in the wave gesture region having spatial mean differences indicating sufficient reflected light intensity in the tile, wherein the timestamp data structure stores timestamps for each tile of the wave gesture region; and
  means for analyzing the timestamps in the timestamp data structure to determine if a wave gesture has occurred; and
  outputting an indication that a wave gesture has been detected.

* * * * *